US011334839B2

(12) United States Patent
Farley et al.

(10) Patent No.: US 11,334,839 B2
(45) Date of Patent: May 17, 2022

(54) ITEM SHIPPING SCREENING AND VALIDATION

(71) Applicant: International Bridge, Inc., Orem, UT (US)

(72) Inventors: John Farley, Orem, UT (US); John Warr, Springville, UT (US); Cameron M. Laghaeian, Leesburg, VA (US)

(73) Assignee: International Bridge, Inc., Orem, UT (US)

( * ) Notice: Subject to any disclaimer, the term of this patent is extended or adjusted under 35 U.S.C. 154(b) by 181 days.

(21) Appl. No.: 16/535,767

(22) Filed: Aug. 8, 2019

(65) Prior Publication Data

US 2019/0362297 A1   Nov. 28, 2019

Related U.S. Application Data

(63) Continuation of application No. 15/490,520, filed on Apr. 18, 2017, now Pat. No. 10,417,602.

(51) Int. Cl.
*G06Q 10/08* (2012.01)
*G06N 20/00* (2019.01)
(Continued)

(52) U.S. Cl.
CPC ........... *G06Q 10/083* (2013.01); *G06N 5/022* (2013.01); *G06N 7/005* (2013.01); *G06N 20/00* (2019.01)

(58) Field of Classification Search
CPC ...... G06Q 10/083; G06N 5/022; G06N 7/005; G06N 20/00
See application file for complete search history.

(56) References Cited

U.S. PATENT DOCUMENTS 5,768,384 A    6/1998  Berson
7,312,702 B1  12/2007  Willms et al.
(Continued)

FOREIGN PATENT DOCUMENTS

WO   WO 2016/057000         4/2016
WO   WO-2016057000 A1 *     4/2016   ........... G06F 16/285
WO   WO 2016/105676         6/2016

OTHER PUBLICATIONS

Ding, et al., "Auto-Categorization of HS Code Using Background Net Approach," *ScienceDirect*, 60:1462-1471, (2015).
(Continued)

*Primary Examiner* — Nathan A Mitchell
(74) *Attorney, Agent, or Firm* — Parsons Behle & Latimer

(57) ABSTRACT

A method and system for vetting items being shipped across national boundaries using a new technology enabling an automated system is provided. The automated system screens items for shipping through customs and validating the items for shipment according to customs rules and regulations. The system identifies and applies the appropriate rules for customs and other responsible agencies pertaining to the eligibility of any item being imported into a particular country. The present invention utilizes an unconventional combination of image recognition technology, machine learning algorithms, and rule engine algorithms to categorize, identify, and apply the appropriate rules to each and every item being considered for importation to another country. Based on the specific combination of technological processes and systems, the present invention is configured to accept, reject, or submit products for further review in a consistent, predictable, and accurate manner, not previously achievable in prior systems and methods.

33 Claims, 8 Drawing Sheets

(51) Int. Cl.
*G06N 7/00* (2006.01)
*G06N 5/02* (2006.01)

(56) References Cited

U.S. PATENT DOCUMENTS

| | | | |
|---|---|---|---|
| 7,735,731 B2 | 6/2010 | Skaaksrud et al. | |
| 7,753,271 B2 | 7/2010 | Skaaksrud et al. | |
| 7,766,230 B2 | 8/2010 | Skaaksrud et al. | |
| 7,775,431 B2 | 8/2010 | Skaaksrud et al. | |
| 7,798,400 B2 | 9/2010 | Skaaksrud et al. | |
| 7,810,724 B2 | 10/2010 | Skaaksrud et al. | |
| 7,837,105 B2 | 11/2010 | Skaaksrud et al. | |
| 7,844,553 B2 | 11/2010 | Whitehouse | |
| 7,870,999 B2 | 1/2011 | Skaaksrud et al. | |
| 7,883,013 B2 | 2/2011 | Skaaksrud et al. | |
| 7,886,972 B2 | 2/2011 | Skaaksrud et al. | |
| 10,108,921 B2 * | 10/2018 | Sultan | G06Q 40/12 |
| 2003/0069738 A1 | 4/2003 | Casey et al. | |
| 2003/0195815 A1 | 10/2003 | Li et al. | |
| 2004/0098272 A1 | 5/2004 | Kapsis et al. | |
| 2004/0143600 A1 | 7/2004 | Musgrove | |
| 2004/0243484 A1 * | 12/2004 | Smith | G06Q 30/0601 705/26.1 |
| 2005/0004894 A1 * | 1/2005 | Uy | G06Q 10/0875 |
| 2005/0010431 A1 | 1/2005 | Uy et al. | |
| 2005/0015390 A1 | 1/2005 | Uy et al. | |
| 2005/0114219 A1 | 5/2005 | Sultan | |
| 2006/0011716 A1 | 1/2006 | Perkowski | |
| 2006/0036504 A1 * | 2/2006 | Allocca | G06Q 30/0601 705/26.1 |
| 2007/0073592 A1 | 3/2007 | Perry et al. | |
| 2008/0091577 A1 | 4/2008 | Holmes et al. | |
| 2008/0230607 A1 | 9/2008 | Etten | |
| 2008/0255863 A1 | 10/2008 | Mack et al. | |
| 2009/0019008 A1 | 1/2009 | Moore | |
| 2009/0034790 A1 | 2/2009 | Song et al. | |
| 2009/0043674 A1 | 2/2009 | Minsky | |
| 2010/0088208 A1 | 4/2010 | Saxena et al. | |
| 2011/0066549 A1 | 3/2011 | Whitehouse | |
| 2011/0078029 A1 | 3/2011 | Bickle et al. | |
| 2011/0161249 A1 | 6/2011 | Whitehouse | |
| 2011/0274275 A1 | 11/2011 | Seitz | |
| 2011/0307405 A1 | 12/2011 | Hammer et al. | |
| 2012/0005105 A1 | 1/2012 | Beier et al. | |
| 2012/0290440 A1 | 11/2012 | Hoffman et al. | |
| 2013/0031350 A1 | 1/2013 | Thielen | |
| 2013/0117353 A1 | 5/2013 | Wong et al. | |
| 2013/0277425 A1 | 10/2013 | Sharma et al. | |
| 2014/0201094 A1 * | 7/2014 | Herrington | G06Q 30/018 705/317 |
| 2015/0066695 A1 * | 3/2015 | Delingat | G06Q 30/0609 705/26.35 |
| 2015/0154539 A1 | 6/2015 | Skaaksrud et al. | |
| 2016/0180286 A1 | 6/2016 | Farley | |
| 2016/0192188 A1 * | 6/2016 | Coulier | H04W 12/0433 380/270 |
| 2017/0046808 A1 * | 2/2017 | Parrish | G06Q 10/00 |
| 2017/0132489 A1 * | 5/2017 | Simgi | G06K 9/4671 |
| 2017/0140526 A1 * | 5/2017 | Chen | G06K 9/3233 |
| 2018/0157932 A1 * | 6/2018 | Gu | G06K 9/6227 |
| 2018/0300668 A1 | 10/2018 | Farley et al. | |
| 2021/0334924 A1 * | 10/2021 | Black | G06N 5/022 |

OTHER PUBLICATIONS

Excerpt from "Animation: Descartes CustomsInfo™ Manager." Originally published Feb. 2017. Retrived from https://www.youtube.com/watch?v=jG9jez5qGmU, Feb. 2019 (1 page).

"HS Classification Assistance Tool." 3CE Technologies. Retrieved from http://www.3cd.com/solutions/customs-and-regulatory-compliance/hs-classification-assistance-tool/, Feb. 2019 (4 pages).

"FindmyHS." Flatworld Labs. Retrived from http://www.flatworldlabs.com/FindmyHS.php, Feb. 2019 (2 pages).

International Search Report for International Application No. PCT/US2015/059694, dated Feb. 2, 2016.

Non-Final Office Action for U.S. Appl. No. 14/579,768, dated May 2, 2017.

Final Office Action for U.S. Appl. No. 14/579,768, dated Oct. 31, 2017.

Non-Final Office Action for U.S. Appl. No. 14/579,768, dated Apr. 19, 2018.

Final Office Action for U.S. Appl. No. 14/579,768, dated Jan. 2, 2019.

Non-Final Office Action for U.S. Appl. No. 15/490,520, dated Mar. 4, 2019.

Notice of Allowance for U.S. Appl. No. 15/490,520, dated May 21, 2019.

Non-Final Office Action from U.S. Appl. No. 14/579,768, dated Dec. 9, 2019.

Notice of Allowance for U.S. Appl. No. 14/579,768, dated Apr. 6, 2020.

* cited by examiner

ITEM SHIPPING SCREENING AND VALIDATION

CROSS-REFERENCE TO RELATED APPLICATION(S)

This application is a continuation of, claims priority to, and the benefit of, co-pending U.S. application Ser. No. 15/490,520 filed Apr. 18, 2017, for all subject matter common to said applications. The disclosure of said application is hereby incorporated by reference in its entirety.

FIELD OF THE INVENTION

The present invention relates to an item shipping and validation system suitable for autonomously vetting items being shipped across national boundaries. In particular, the present invention relates to an unconventional combination of processes and components that provide a technology based solution for autonomously screening items for shipping through customs and validating the items for shipment according to customs rules and regulations in a manner that improves computer-related technology by enabling a computer implemented process not previously performable by a computer.

BACKGROUND

Generally, the biggest barriers to efficient transfer of goods between nations are the various rules and regulations that limit or prohibit the importation of products produced in another national entity to be imported. These rules are in place for reasons as diverse as prohibition of the importation of farm products, hazardous materials, intellectual property violations, etc. Considering the number and volume of products being exported and imported on a daily basis and the actual list of reasons for a product to not be allowed to be transported between different nations, the process for reviewing the products is tedious and labor intensive. In particular, the conventional methodology for accomplishing the review of an item's eligibility to be imported or exported is performed using manual labor, as it involves analyzing the description of the product, reviewing any images of the product that might be available, and cross-referencing that information against the various rules and regulations, before determining whether or not an item can be allowed to be shipped across borders. Maintaining such a labor force is expensive and harbors inherent inefficiencies of relying on human judgement for reviewing millions of items being shipped to and from various countries. Additionally, because of the nature of this task, the error rate for the determination of acceptability of any item being imported is relatively high due to various factors, such as the level of training and experience of the review personnel, as well as the fatigue factor when each preview team member can and does potentially review, approve, and reject thousands of items per day, while trying to apply customs rules to all these items on a daily basis. Accordingly, there currently exists a bottleneck for the logistics aspect of shipping products internationally. However, it has not been possible prior to now to automate this process and remove the manual labor because conventional systems and methods do not enable automation of these processes.

SUMMARY

There is a need for new technology to handle screening and validation of products for shipment across national boundaries. The present invention is directed toward further solutions to address this need, in addition to having other desirable characteristics. Specifically, present invention relates to computer-based automation for the categorization of products and items being shipped across national boundaries, which necessitates the identification and application of appropriate customs and other responsible agencies rules pertaining to the eligibility of any item being imported into a particular country. The present invention utilizes an unconventional combination of image recognition technology, machine learning algorithms, and rule engine algorithms to categorize, identify, and apply the appropriate rules to each and every item being considered for importation to another country, thereby introducing a technology based solution for autonomously screening items for shipping through customs and validating the items for shipment according to customs rules and regulations in a manner that improves computer-related technology by enabling a computer implemented process not previously performable by a computer. In particular, the present invention involves analyzing information for an item, applying the necessary rules for what items can be shipped and imported from a source country to any destination country in a manner that eliminates potential bottlenecks, can process millions of records, and can be configured to monitor and manage shipments from any source country to any destination country. Based on the specific and unconventional combination of technological processes and systems, the present invention is configured to accept, reject, or submit products or items for further review in a consistent, predictable, and accurate manner, not previously achievable in existing systems and methods. The process and system provided by the present invention improves efficiency, consistency, and reduces the costs of traditional shipment screening of items between nations. Specifically, by implementing the present invention, a logistics company can transport millions of items across various borders without the need for a very large team of reviewers while eliminating the potential importation issues with customs.

In accordance with example embodiments of the present invention, an automated machine-implemented customs approval method is provided. The method includes receiving item data that includes a combination of description, meta-tags, and one or more images for each of one or more items, scanning the one or more images for each of the one or more items through an image recognition system, and creating a list of identity markers for the item data based on the scanning of the one or more items by the image recognition system and the combination of description, meta-tags, and one or more images included within the item data. The method also includes applying a probability formula utilizing the list of identity markers to determine potential classes and categories matching one or more predefined classes and categories for the one or more items based on key words and phrases located within the list of identity markers and applying specific rules of shippability, based on the class and category, to the item data of the one or more items. The method further includes classifying the one or more items associated with the item data as shippable, not shippable, or questionable based on application of the class and category of the one or more items. When an item is marked as questionable, item data associated with the item is transmitted to a reviewer to determine shippability of the item in question.

In accordance with aspects of the present invention, the item data can be provided by a manufacturer, seller, logistics company, or reseller of the one or more items. The item data can be obtained from a catalog including the one or more items provided a seller the one or more items. The description can include information related to at least one of physical attributes, functionality, and source material of the one or more items.

In accordance with aspects of the present invention, the specific rules of shippability are derived from rules established by the appropriate governmental or regulatory authorities within each country and applied to items based on information provided by a manufacturer, seller, logistics company, or reseller of the one or more items. An item can be marked as questionable if there is insufficient and/or contradicting information about the item. A reviewer can update the specific rules of shippability to include new rules or modified existing rules. The specific rules of shippability can be provided by rules and regulations within a destination country's customs and regulations agency, rules governing intellectual property (IP), internal set rules of any other party, or a combination thereof.

In accordance with aspects of the present invention, the class and category are determined by a linear classifier algorithm. The linear classifier algorithm can determine whether the one or more items have been previously classified. The application of the probability formula can also include calculating a confidence factor for each of potential classes and categories for each of the one or more items, selecting the potential classes and categories with a highest confidence factor for each of the one or more items, and when a predetermined confidence factor is not achieved for a particular item, the particular item is classified as questionable and forwarded to a reviewer to determine class and category. Training the linear classifier algorithm can include training with feedback from the reviewer to increase determination of the confidence factor, wherein a decision of the reviewer is factored into the probability formula and resulting confidence factor next time an item with similar characteristics is encountered by the probability formula, causing the item to be categorized with a higher confidence factor.

In accordance with example embodiments of the present invention, an automated machine-implemented customs approval system is provided. The system includes a data gathering and staging system configured to receive item data that includes a combination of description, meta-tags, and images for one or more items and an image recognition system configured to scan the one or more images for each of the one or more items. The image recognition system creates a list of identity markers for the item data based on the scanning of the one or more items and the combination of description, meta-tags, and images included within the item data. The system also includes an algorithm module configured to apply a probability formula utilizing the list of identity markers to determine potential classes and categories matching one or more predefined classes and categories for the one or more items based on key words and phrases located within the list of identity markers. The system further includes a rules engine configured to apply specific rules of shippability, based on the class and category, to the item data of the one or more items. The rules engine classifies the one or more items associated with the item data as shippable, not shippable, or questionable based on application of the class and category of the one or more items and when an item is marked as questionable, transmitting item data associated with the item to a reviewer to determine shippability of the item in question.

In accordance with aspects of the present invention, the item data can be provided by a manufacturer, seller, logistics company, or reseller of the one or more items. The item data can be obtained from a catalog including the one or more items provided a seller the one or more items. The description can include information related to at least one of physical attributes, functionality, and source material of the one or more items.

In accordance with aspects of the present invention, the specific rules of shippability are derived from rules established by the appropriate governmental or regulatory authorities within each country and applied to items based on information provided by a manufacturer, seller, logistics company, or reseller of the one or more items. An item can be marked as questionable if there is insufficient and/or contradicting information about the item. A reviewer can update the specific rules of shippability to include new rules or modified existing rules. The specific rules of shippability can be provided by rules and regulations within a destination country's customs and regulations agency, rules governing intellectual property (IP), internal set rules of any other party, or a combination thereof.

In accordance with aspects of the present invention, the class and category are determined by a linear classifier algorithm. The linear classifier algorithm can determine whether the one or more items have been previously classified. The application of the probability formula can also include calculating a confidence factor for each of potential classes and categories for each of the one or more items, selecting the potential classes and categories with a highest confidence factor for each of the one or more items, and when a predetermined confidence factor is not achieved for a particular item, the particular item is classified as questionable and forwarded to a reviewer to determine class and category. Training the linear classifier algorithm can include training with feedback from the reviewer to increase determination of the confidence factor, wherein a decision of the reviewer is factored into the probability formula and resulting confidence factor next time an item with similar characteristics is encountered by the probability formula, causing the item to be categorized with a higher confidence factor.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
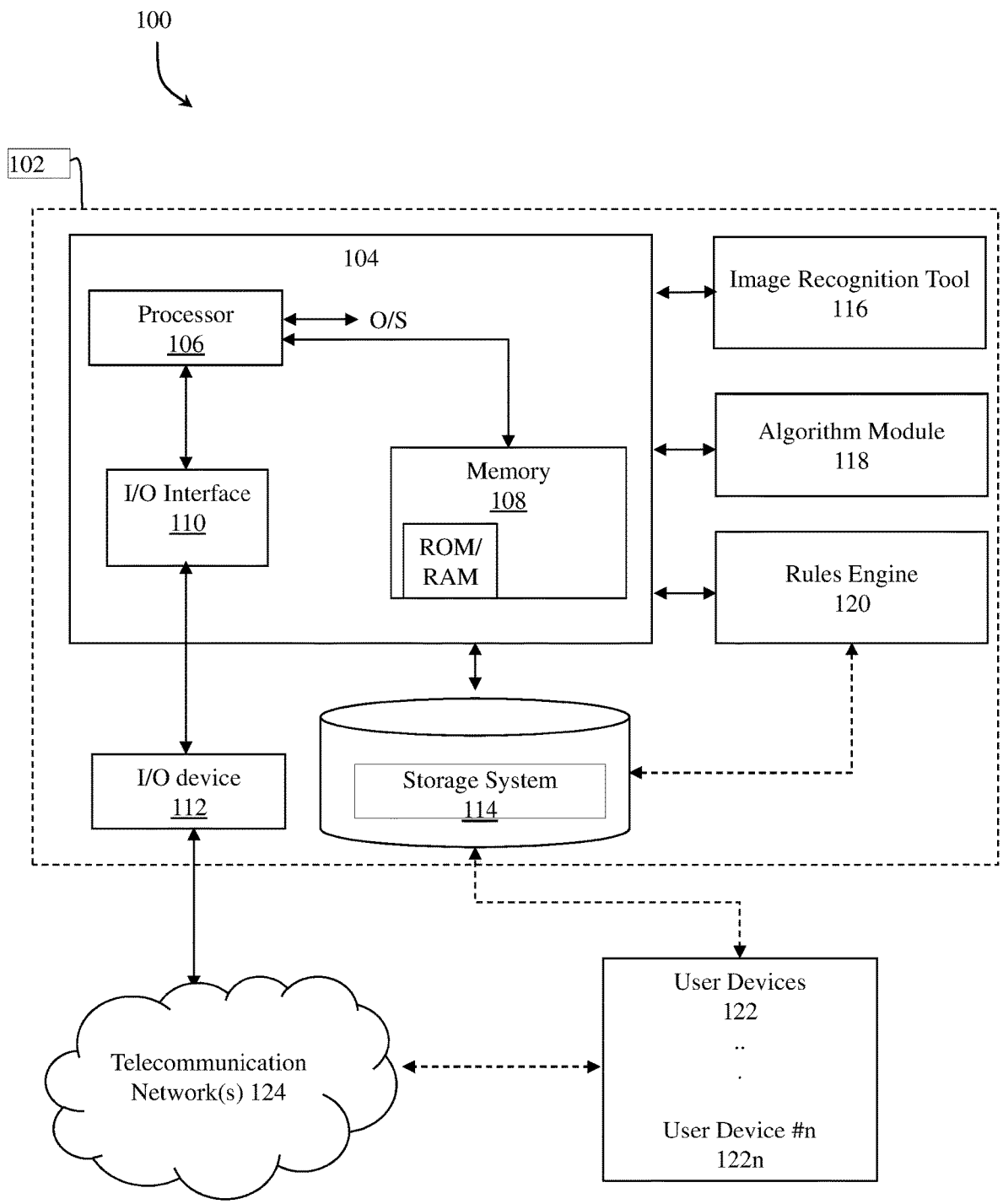
FIG. 1 is a diagrammatic illustration of a system for implementation of the present invention.

An illustrative embodiment of the present invention relates to a system and method for analyzing and categorizing items in an automated manner, the items to be shipped across national borders according to a predetermined set of rules and regulations. Specifically, the present invention utilizes an unconventional combination of processes and components that provide a technology based solution for autonomously screening items for shipping through customs and validating the items for shipment according to customs rules and regulations in a manner that improves computer-related technology by enabling a computer implemented process not previously performable by a computer. Information about the item is collected from the seller. The information includes any information relevant to shipping the item between counties, including but not limited to an item description, meta-tags, images, etc. The system of the present invention processes the description, meta-tags, etc., and any images through an image recognition system to generate a list of identity markers, such as words and phrases used when describing an apparel (e.g., dress, pants, slacks, blouse, etc.) and the category for an item (ladies', women's, men's, etc.). The identity markers are input into a collection of machine learning algorithms designed to determine the classifications and categories for the items. In particular, a linear classifier algorithm utilizes the markers in probability formulas to determine the likelihood that an item belongs to a specific classification (e.g., apparel) and a category within that classification (e.g., a ladies' dress).

Additionally, the linear classifier algorithm calculates a confidence factor for the decision on every classification and categorization for each item. The confidence factor is utilized to gauge the accuracy of the decision being made by the algorithm. Based on a threshold level for the confidence factor, an item can be tagged for additional review. For example, when the linear classifier algorithm establishes a confidence factor for the classification and categorization of an item below an acceptable threshold level, the decision is tagged to be reviewed, approved, or corrected if necessary. After tagged review, every approval or correction of a decision provided by the linear classifier algorithm is considered by the algorithm module to improve the decision process and the linear classifier algorithm adjusts a resulting confidence factor up or down based on the approval or correction, effectively training the linear classifier algorithm and improving the accuracy on all subsequent decisions made by the linear classifier algorithm.

In addition, the system and method of the present invention applies specific rules to determine the shippability (e.g., whether or not an item is permitted to be shipped from one country to another) of an item, utilizing a rules engine. In particular, the rules engine determines whether items are shippable or not based on the classification from the earlier step and the rules associated with a destination country. The rules utilized by the rules engine are derived from rules and regulations within customs and regulations established by a customs agency for the destination country. For example, the rules relate to guidelines governing Intellectual Property (IP) and any internally set rules by any of the parties involved within the transaction for the item(s) in question, such as minimum/maximum price, quantity, weight, etc. Once a determination is made by the rules engine, the rules engine to make a final determination for the items eligibility for sale or delivery to a buyer in the destination country. The final determination can include accepting and rejecting an item based on a class level of the item (e.g., weapons), category level of the item (e.g., flashlights), a specific item within a category (e.g., battery powered watches vs. mechanical watches), or a combination thereof.

If the rules engine does not have sufficient information for the automatic determination of shippability of an item, such as lack of any images for the product, or contradictory description keywords and tags, the item is forwarded by the rules engine to a review team for additional analysis. Once the review team has analyzed and successfully determines the shippability of an item, the rules engine can then apply the remainder of the rules and determine the eligibility of the item to be purchased and delivered to the destination country. If during the review process the team discovers any new rules to be created or existing rules to be adjusted, they may take the necessary action, enabling the rules engine to not require the intervention of the review team in subsequent cases. Based on the results of the analysis process of the present invention, items are reviewed in an automated manner for approval or denial for being shipped between countries.

In summary, the present invention provides a system and method for automating the screening and approval process for shipping items over national borders, utilizing a novel methodology never previously utilized. The present invention enables the automation by utilizing machine learning techniques and applying algorithms that help tokenize human speech describing the item and any images of the items. In addition to the linear classifier algorithm, the present invention utilizes decisions made by experts as they manually review items being imported to load the item information and the ultimate item type selected by the experts into the decision making process of the automated system and method to train the system. In particular, during the training phase, the present invention tokenizes the specific words and phrases as well as characteristics of the item images using an image recognition system and links them to the possible decision as to the impact on the determination of any item. More specifically, the present invention analyzes the description of the items, searching specifically for the combination of words and phrases that are used in describing any item for human review as items are offered for sale. The present invention assembles a list of possible item types that are ordered by the confidence factor, a numerical factor calculated based on the number of tokens that any item of a specific type has had in the past. The type of item with the highest confidence factor is selected and all rules for acceptance and rejection of the item type by the particular customs rules of the country receiving the item are applied by the invention to determine importability of the item. As a result of the above-combination of steps, the present invention enables a computer implemented system to autonomously review items and determine a shippability of those items based on the machine review. More specifically, the unique combination of steps provides an improvement in computer-related technology by implementing a specific set of rules that improve the computer-related technology by allowing autonomous performance of item screening and a determination of shippability of items, which was not previously performable by a computer.

FIGS. 1 through 8, wherein like parts are designated by like reference numerals throughout, illustrate an example embodiment or embodiments of an unconventional combination of processes and components that provide a technology based solution for autonomously screening items for shipping through customs and validating the items for shipment not previously performable by a computer according to customs rules and regulations in accordance with the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed in a manner still in keeping with the spirit and scope of the present invention.

FIG. 1 depicts an illustrative system 100 for implementing the steps in accordance with the aspects of the present invention. In particular, FIG. 1 depicts a system 100 including an item shipping and validation system 102. In accordance with an example embodiment, the item shipping and validation system 102 is a combination of hardware and software configured to carry out aspects of the present invention. In particular, the item shipping and validation system 102 can include a computing system with specialized software and databases designed for providing the processes 200, 300, 400, 500, 600, 700 in accordance with the present invention. For example, the item shipping and validation system 102 can be software installed on a computing device 104, (e.g., a web based application provided by a computing device 104) which is accessible by computing devices (e.g., the user devices 122 via a cloud based application). The combination of hardware and software that make up the item shipping and validation system 102 are specifically configured to provide a technical solution to a particular problem utilizing an unconventional combination of steps/operations to carry out aspects of the present invention. In particular, the item shipping and validation system 102 is designed to execute a unique combination of steps to provide a novel approach to autonomously screening items for shippability between nations according to the rules and regulations for those nations.

In accordance with an example embodiment of the present invention, the item shipping and validation system 102 includes a computing device 104 having a processor 106, a memory 108, an input output interface 110, input and output devices 112 and a storage system 114. Additionally, the computing device 104 can include an operating system configured to carry out operations for the applications installed thereon. As would be appreciated by one skilled in the art, the computing device 104 can include a single computing device, a collection of computing devices in a network computing system, a cloud computing infrastructure, or a combination thereof, as would be appreciated by those of skill in the art. Similarly, as would be appreciated by one skill in the art, the storage system 114 can include any combination of computing devices configured to store and organize a collection of data. For example, storage system 114 can be a local storage device on the computing device 104, a remote database facility, or a cloud computing storage environment. The storage system 114 can also include a database management system utilizing a given database model configured to interact with a user for analyzing the database data.

Continuing with FIG. 1, the item shipping and validation system 102 includes a combination of core components configured to carry out the various functions of the present invention. In accordance with an example embodiment of the present invention, the item shipping and validation system 102 include an image recognition tool 116, a machine learning algorithm/linear classifier algorithm module 118, and a rules engine 120. As would be appreciated by one skilled in the art, the image recognition tool 116, the algorithms module 118, and the rules engine 120 can include any combination of hardware and software configured to carry out the various aspects of the present invention. In particular, each of the image recognition tool 116, the algorithm module 118, and the rules engine 120 are configured to provide users with a system 100 to search data streams for particular content.

In accordance with an example embodiment of the present invention, the system 100 includes a plurality of user devices 122 configured to communicate with the item shipping and validation system 102 over a telecommunication network(s) 124. The item shipping and validation system 102 can act as a centralized host, for the user devices 122, providing the functionality of the components 116, 118, 120, sharing a secured network connection. As would be appreciated by one skilled in the art, the plurality of user devices 122 can include any combination of computing devices, as described with respect to the item shipping and validation system 102 computing device 104. For example, the computing device 104 and the plurality of user devices 122 can include any combination of servers, personal computers, laptops, tablets, smartphones, etc. In accordance with an example embodiment of the present invention, the computing devices 104, 122 are configured to establish a connection and communicate over telecommunication network(s) 124 to carry out aspects of the present invention. As would be appreciated by one skilled in the art, the telecommunication network(s) 124 can include any combination of known networks. For example, the telecommunication network(s) 124 may be combination of a mobile network, WAN, LAN, or other type of network. The telecommunication network(s) 124 can be used to exchange data between the computing devices 104, 122, exchange data with the storage system 114, and/or to collect data from additional sources.

Figure 2:
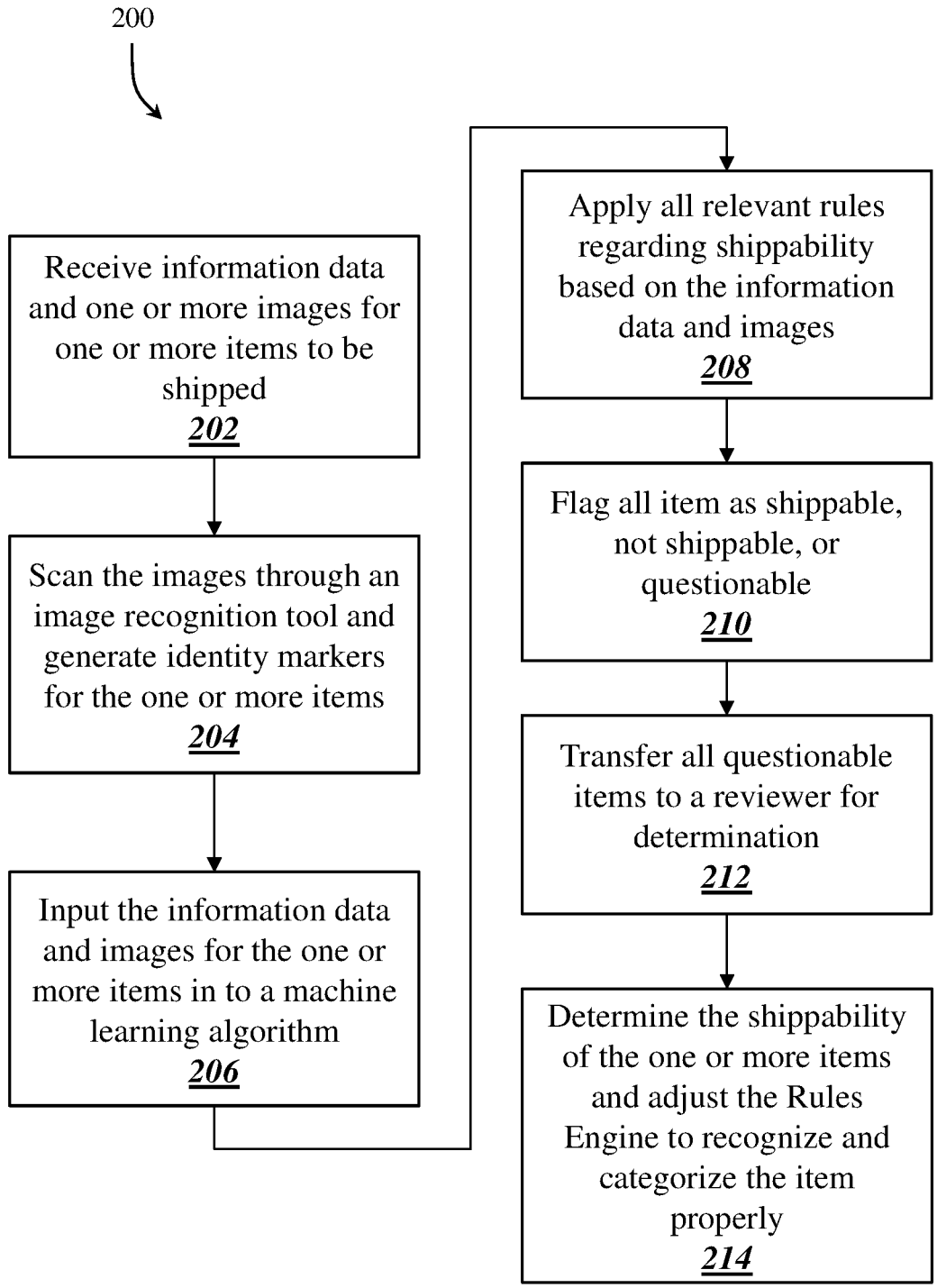
FIG. 2 is an illustrative flowchart depicting an example operation of the item shipping and validation system, in accordance with aspects of the invention.

FIG. 2 depicts an illustrative example operation of the item shipping and validation system 102 in accordance with the present invention. In particular, FIG. 2 depicts a process 200 for autonomously scanning and validating items to be shipped over national borders. At step 202 the system 100 receives, or otherwise obtains, any information data and one or more images for an item to be shipped over national borders. In accordance with an example embodiment of the present invention, the information data for the items includes information related to the item description, meta-tags, one or more images, specific identifying keywords, etc. As would be appreciated by one skilled in the art, the information data can be received or obtained from variety of sources. For example, the information data and one or more images can be provided by a manufacturer of the item, a seller of the item, a logistics company responsible for the delivery of an item (e.g., as part of the partnership agreement), a shipper of the item, or a combination thereof. Additionally, the information can be formally exchanged among the various parties involved in the manufacture, sale, and delivery of the item, or it could be obtained from the information generally available about the item from any of the above-mentioned sources. For example, the information data and images can be derived from online information provided by the seller (e.g., data associated with the items in an online catalog).

At step 204 the one or more images obtained from step 202 are scanned for additional information data or image data. In accordance with an example embodiment of the present invention, the one or more images are scanned utilizing an image recognition tool 116 to identify and extract additional image data for the depicted items. In particular, the image recognition tool 116 is configured to scan the images and generate image meta-tags for data obtained about the item from the scanned images. In particular, the image recognition tool 116 utilizes algorithms for identifying keywords using semantic rules and image related identity markers through image recognition. The keywords further define and/or verify the characteristics of an item but also any potential logos or trademarks that are visible in an image. For example, the image recognition tool 116 utilizes an extensive database of logos, locates the logo on any image, searches its database, and returns the logo info if found. As would be appreciated by one skilled in the art, the one or more images can be scanned utilizing any combination of systems and methods known in the art.

Additionally, at step 204, the system 100 creates a list of identity markers (e.g., key words and phrases, logos, etc.) for the item based on the image meta-tags derived by the image recognition tool 116 in combination with the item description, meta-tags, and one or more images included within the information data received/obtained in step 202. Thereafter the system 100 creates a relationship between how often any word or phrase from the list of identity markers is found in image data and the category of an item as determined by an expert during an initial teaching/training phase of the implementation.

At step 206 the system 100 inputs the information data and image(s) (including the data obtained from the image recognition tool 116) for the item into a linear classifier algorithm (e.g., provided by the algorithm module 118). The linear classifier algorithm utilizes the information and image data to identify potential classes and categories for an item as it pertains to the rules potentially prohibiting or restricting the importation of the items from one country to another. The class and categories for a given item are determined based on key words or phrases found in the description and the meta-tags. In particular, all of the received data inputs are digested by a linear classifier algorithm to determine a class and category of an item by applying a probability formula utilizing the list of identity markers to determine a class and category matching one or more predefined classes and categories for the one or more items based on the list of identity markers. In particular, the probability formula calculates a number of times a collection of particular words and phrases have been identified as representing a particular item's class and category, which is later used to calculate a confidence factor. In accordance with an example embodiment of the present invention, the determined class and category for an item are associated with a confidence factor, which is used to set a bar for acceptance of the algorithm's decision or prompting the review team to audit the decision and approve or adjust the decision. Elements involved in steps 202-206 are discussed in greater detail with respect to FIG. 3.

Once an item has been classified and categorized by the linear classifier algorithm, all the associated identifying tags and keywords are used by a rules engine 120 to identify the item's class and category, which helps determine the specific rules for items of that specific class and category to be shippable to a particular country (e.g., accepted and an import into a particular destination country). In particular, at step 208, the rules engine 120 applies a specific set of rules for shippability (e.g., for a destination country), based on the classification and categorization from step 206 and the item information and image data. The classes and categories for an item dictate (along with a destination nation(s)) which rules are applied by a rules engine 120. For example, importation rules applied for apparel may be different than the rules applied to weapons. In accordance with an example embodiment of the present invention the specific set of rules are created from the rules and regulation established by the importation authority or customs of the destination country. For example, the rules and regulations include rules governing Intellectual Property (IP) and any internally set rules by any of the parties, such as minimum/maximum price, quantity, weight, etc., or a combination thereof. As would be appreciated by one skilled in the art, the rules can be obtained and/or derived utilizing any combination of methods and systems known in the art. For example, the specific rules of shippability can be provided by a manufacturer, seller, logistics company, or reseller of the item. As the rules are applied to the item, the item can then be automatically categorized as shippable, not shippable, or questionable.

At step 210 the system 100 flags each item under consideration as shippable, not shippable, or questionable, based on the rules applied in step 208. Items flagged as shippable are items determined to be in compliance with the rules and regulations of the destination country. Alternatively, items flagged as not shippable are items determined to violate the rules and regulations of the destination country. An item is marked as questionable if there is insufficient and/or contradicting information about the item.

At step 212 the system 100 transfers all items flagged with a questionable designation to an independent reviewer or review team. In accordance with an example embodiment of the present invention, the independent or review team includes a human reviewer(s) with knowledge of the customs rules for the particular item. The transferring of the items includes transmitting all of the information and image data for the item and the status of the item to the reviewer(s). The status includes an indication as to why the item was flagged as questionable, such that the reviewer(s) can resolve the issue. For example, if an item was flagged because there was incomplete information or conflicting information, the reviewer(s) will be provided with information of the incomplete information or conflicting information and take the appropriate action.

At step 214 reviewer(s) determine the shippability of the item in question, based on the information provided at step 212. The reviewer(s) can also utilize any additional information researched, obtained, derived by the reviewer(s). Additionally, at step 214, the reviewer can optionally update the specific rules utilized by the rules engine 120 to include new rules or modified existing rules. In particular, based on the reason for the questionable designation by the rules engine 120, the reviewer(s) can take steps to update and/or create new rules to be utilized by the rules engine 120 if/when a similar scenario is presented in the future. For example, if the rules engine 120 determined that there was conflicting information, the reviewer(s) can modify/create a rule that outlines how to determine which conflicting information takes precedent, to avoid a questionable designation. If a rule is updated or created, the updated information is returned to rules engine 120.

Figure 3:
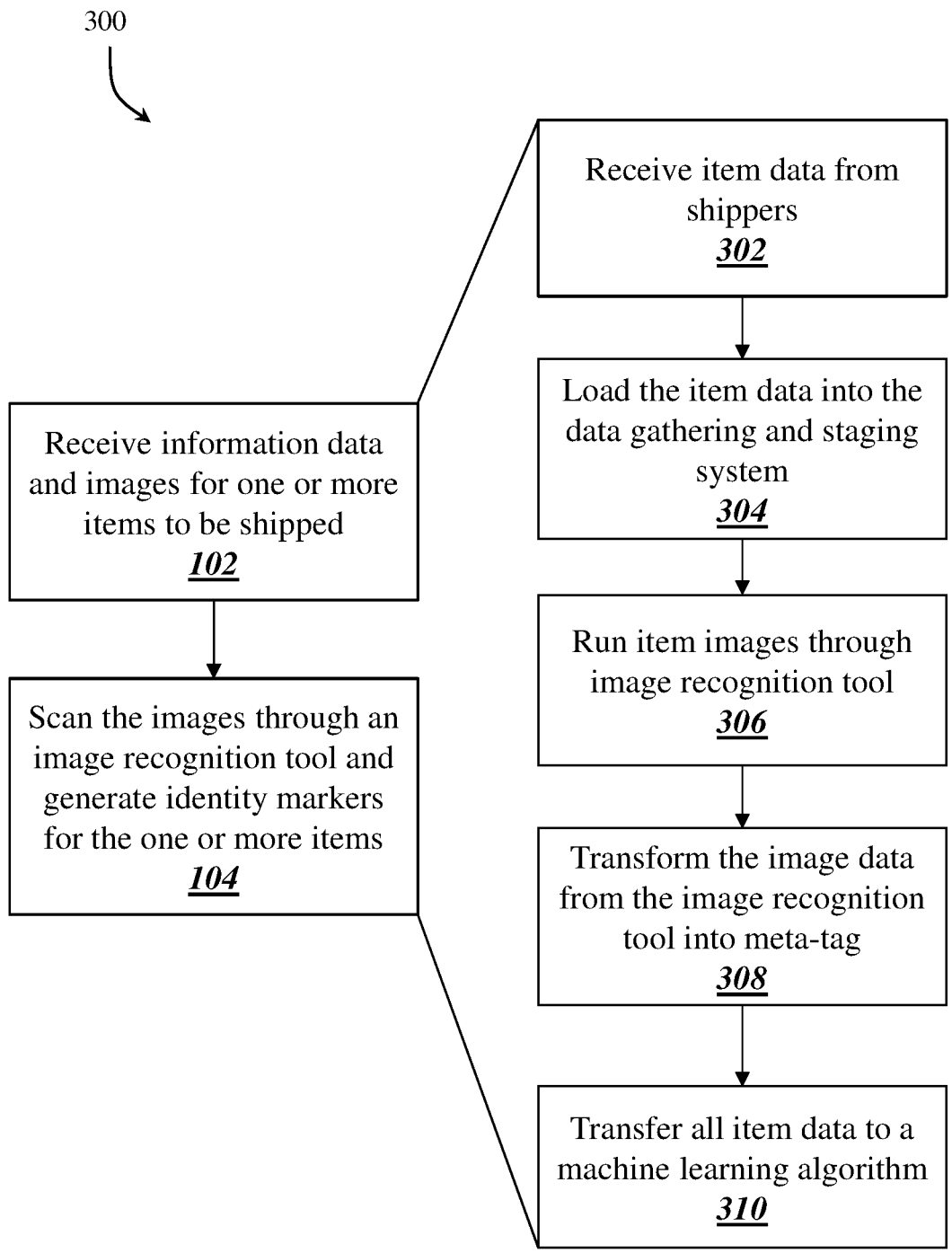
FIG. 3 is an illustrative flowchart depicting a process for preprocessing items to be shipped, in accordance with aspects of the invention.

FIG. 3 depicts an exemplary process 300 for preprocessing items to be shipped. The process 300 includes the specific steps for carrying out the steps 202-206 from process 200, discussed with respect to FIG. 2. In particular, FIG. 3 depicts the process 300 for performing the data gathering and staging of item data for carrying out the other processes (e.g., process 300, 400, 500, 600, 700) of the present invention. Initially, at step 302, the system 100 receives item data for the one or more items being shipped. As discussed with respect to FIG. 2, the item data can include a combination of informational data describing the item and images of the item with data imbedded therein or derivable therefrom. For example, the item data can include a description which includes information related to at least one of physical attributes, functionality, and source material of the one or more items. In accordance with an example embodiment of the present invention, the item data is provided by a manufacturer, seller, logistics company, or reseller of the one or more items. Similarly, in another example, the item data is obtained from a catalog including the one or more items provided by a seller of the one or more items.

At step 304 of the of item data received in step 302 is loaded into a data gathering and staging system (e.g., the storage system 114). For example, the data gathering and staging system can be provided necessary information about an item from a shipper utilizing an Application Program Interface (API) or providing an API within the shipper's system. The item data can be stored in any manner known in the art that enables the data to be organized and accessible by other components. Once the item data is loaded and stored within the data gathering and staging system (e.g., the image recognition tool 116, the algorithms module 118, the rules engine 120, etc.), the other components of the overall system 100 can utilize the data stored therein in accordance with the present invention.

At step 306 the image recognition tool 116 accesses and analyzes the one or more images for each of the one or more items. The analysis can include any combination of systems and methods for capturing and deriving data from the one or more images. In accordance with an example embodiment of the present invention, the image recognition tool 116 scans the one or more images for meta-tags and other embedded data, known logos, trademarks, copyrights, etc.

At step 308 the system 100 transforms the data captured and derived by the image recognition tool 116, into image data and image meta-tags. For example, the image recognition tool 116 transforms the data into image meta-tags describing the data captured and derived from the one or more images. For example, the one or more images for an item can depict a ladies' dress worn by a human model and the dress could have a logo on the dress. The image recognition tool 116 will provide meta-tags such as 'Female Model', 'Ladies" Dress', and the brand or name associated with the logo on the dress. The image data for each image is stored within the data gathering and staging system (e.g., storage system 114) along with the other information data associated with the one or more items. In particular, each item entry within the data gathering and staging system is updated with image data obtained from respective one or more images for each of the one or more items. At step 310 the image data, including image meta-tags, are delivered to the algorithm module 118 for additional processing. In particular, the data obtained and stored in the data gathering and staging system in process 300 is transmitted to the process 400 for additional processing.

Figure 4:
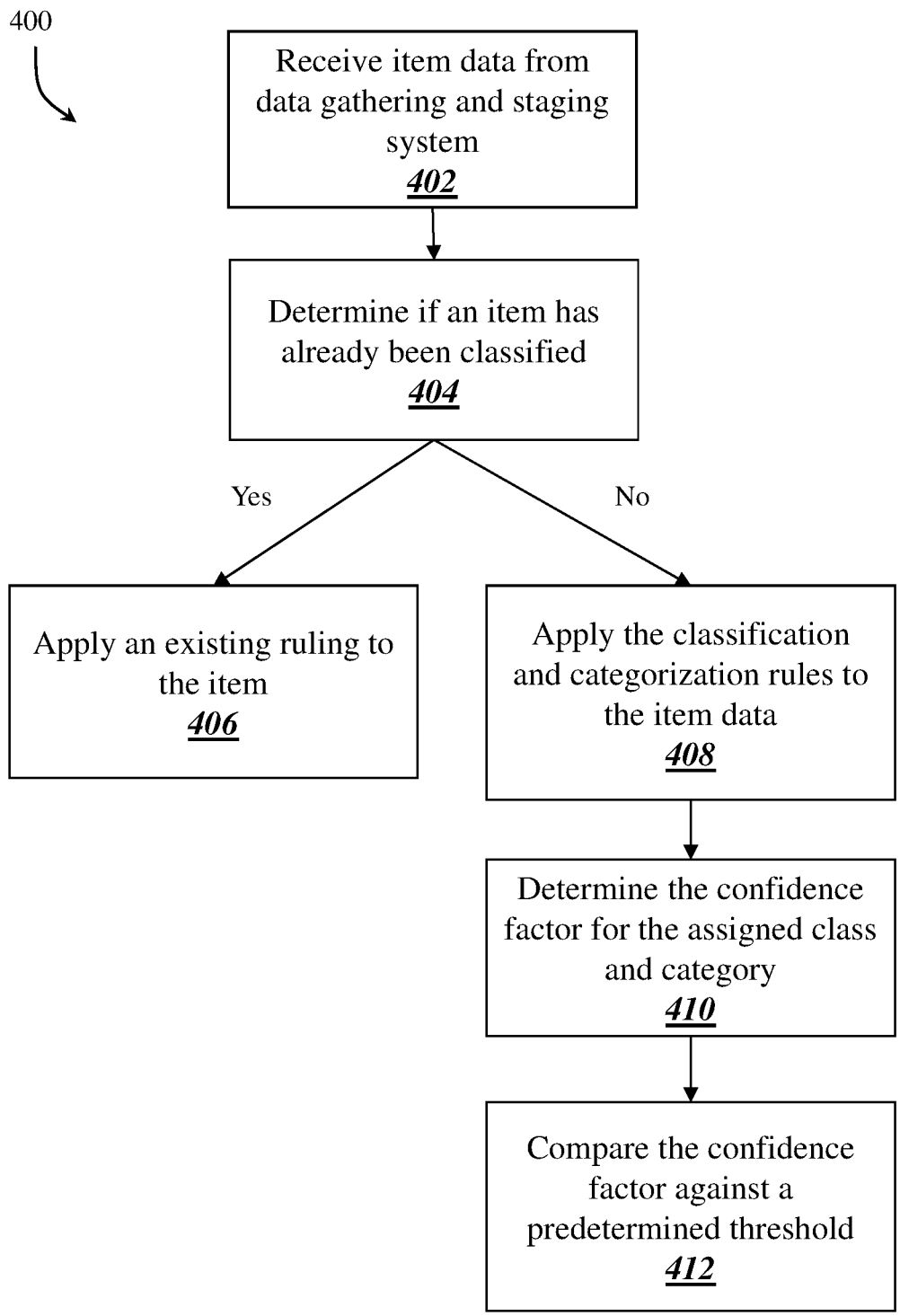
FIG. 4 is an illustrative flowchart depicting a process for determining if an item has been previously classified and categorized, in accordance with aspects of the invention.

FIG. 4 depicts example process 400 for determining if an item has been previously classified and categorized or if the item needs to be classified and categorized. If an item has not been previously classified or categories, then the data for the item, from process 300, is transmitted to the algorithm module 118 to be processed. Initially, at step 402, the algorithm module 118 receives the item data from the data gathering and staging system. At step 404 the algorithm module 118 determines whether the item associated with the item data has been previously classified and categorized, utilizing the linear classifier algorithm, such that any item previously encountered, classified, and categorized is stored within the storage system 114 using any unique identifier for the item (e.g., universal product code, stock keeping unit, etc.). Any future encounter with an item with the same unique identifier, as recognized by the system 100, will be associated with the previous class and category, and the accept/reject ruling is re-issued without any further analysis. As would be appreciated by one skilled in the art, this determination can be made utilizing any methodology known in the art. For example, the algorithm module 118 can check for an existing entry within the classification and categorization data element. If the algorithm module 118 determines that the item has been previously classified or categorized, the process 400 advances to step 406. At step 406 the system 100 applies an existing ruling to an item (e.g., the ruling previously provided when a similar item with the same class or category was accepted or rejected for shipment).

Alternatively, if the algorithm module 118 determines that the item has not been previously classified or categorized, the process 400 advances to step 408. At step 408 the algorithm module 118 applies the classification and categorization rules to the item data to determine a potential classes and categories that the item may fall into. In accordance with an example embodiment of the present invention, the algorithm module 118 utilizes the linear classifier algorithm to determine the classification and categorization for items. Prior to utilization, the linear classifier algorithm ingests a list of items with known classes and categories (e.g., assembled using human trainers reviewing item information and manually choosing class and category for each item) along with item descriptions and image information. Thereafter, the linear classifier algorithm tokenizes the specific words and phrases from the ingested list that would result in an item being classified and categorized as a particular item type. For example, the linear classifier algorithm learns the specific words and phrases that are found in item data and the class and category that those words and phrases are associated with (e.g., the words and phrases associated with a class="Apparel", category="Ladies' dress"). Accordingly, when an unclassified item is provided to the algorithm module 118, the algorithm module 118 executes the linear classifier algorithm to extracts (e.g., through tokenization) the specific words and phrases from the item data of the item, associate those words and phrases with the known words and phrases from the ingested list to determine which class and category the item falls within.

In other words, the linear classifier algorithm, at step 408, can determine the possible candidates for class and category of any item based on the pre-existing database of items that have been classified and categorized by experts. This occurs during the training phase of the invention. The linear classifier algorithm utilizes the database of properly classified and categorized items and their description and images and establishes relationships between an item and its descriptive information. When a new item and its descriptive information is fed into the linear classifier algorithm, the algorithm utilizes the relationships established during the training phase to find possible candidates for the class and category, creating a list of possible classes and categories for the item.

At step 410 the linear classifier algorithm calculates a confidence factor for each potential class and category an item is determined to potentially fit within. Once all relevant data has been reviewed and considered for the item, the class and category with a highest confidence factor is chosen as the class and category for the item. In accordance with an example embodiment of the present invention, the linear classifier algorithm calculates a confidence factor based on the number of times any particular phrase occurs in the item data for an item (e.g., within the item description, derived from the item images, etc.). As would be appreciated by one skilled in the art, the confidence factor can be calculated through any combination of methodologies known in the art without departing from the scope of the present invention.

At step 412 the algorithm module 118 compares the confidence factor against a predetermined acceptable threshold. As would be appreciated by one skilled in the art, the acceptable threshold can be any value and can be adjusted based on user preference. Based on the comparison to the threshold, the algorithm module 118 transfers the item data to a specific set of processing steps. When a confidence factor falls below the threshold, the linear classifier algorithm transfers the item data to process 500 (discussed with respect to FIG. 5) and the items with confidence factors above the threshold are transferred to process 600 (discussed with respect to FIG. 6). Accordingly, the algorithm module 118 transfers items without a confidence factor or with a confidence factor below a predetermined threshold to separate reviewer(s) for additional analysis (e.g., to process 500). For example, if the linear classifier algorithm does not calculate a clear class or category for an item with a high enough confidence factor (e.g., "ladies' dress" vs "ladies' jumpsuit"), it will flag that item as unclassified. Additionally, the algorithm module 118 transfers items with a confidence factor above the predetermined threshold to the rules engine 120 for additional processing (e.g., process 600)

Figure 5:
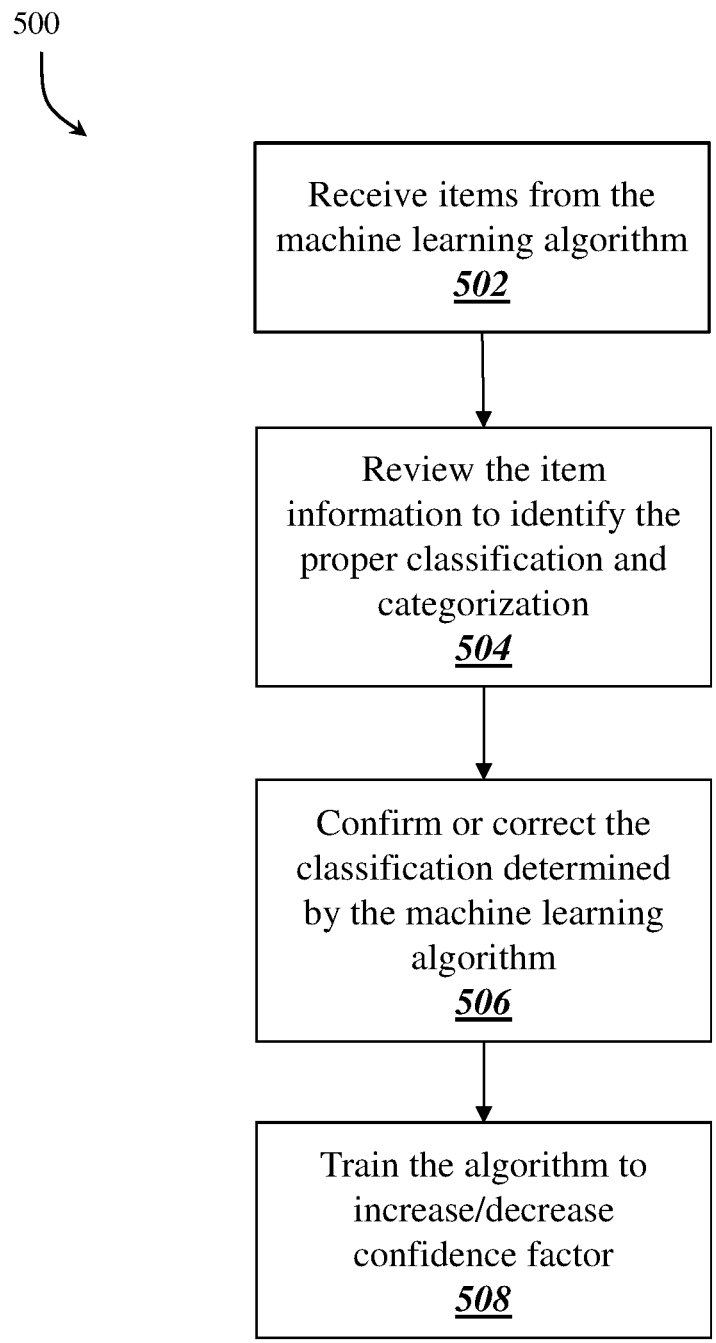
FIG. 5 is an illustrative flowchart depicting a process for classifying items that were unclassified or classified with a low confidence factor, in accordance with aspects of the invention.

FIG. 5 depicts an illustrative example of the review process 500 for items that were unclassified or classified with a low confidence factor. In particular, FIG. 5 depicts the process 500 for when a predetermined confidence factor is not achieved for a particular item (e.g., by the linear classifier algorithm) and the particular item is classified as questionable. The questionable items are forwarded to a reviewer(s) at step 412 to determine a proper class and category for the item. At step 502 the reviewer(s) receives unclassified items from the linear classifier algorithm including the item data, the images, and any other data available in the data gather and staging system. At step 504 the reviewer(s) utilizes human knowledge and experience to assign the proper class and category. At step 506 reviewer(s) confirm or correct the classification determined by the linear classifier algorithm, if there was a classification with a low confidence score.

At step 508 the algorithm module 118 trains the linear classifier algorithm of the algorithm module 118, based on the confirmation or correction provided by the reviewer(s) in step 506. In particular, any approval or adjustments made to a class or category selected by the linear classifier algorithm causes the linear classifier algorithm to make the necessary adjustments to its confidence factor, causing the linear classifier algorithm to learn and become more accurate in future processing of the data. The training of the linear classifier algorithm with feedback from the reviewer increases determination of the confidence factor. Thereafter, the modification provided by the reviewer(s) is factored into the probability formula and resulting confidence factor next time an item with similar characteristics is encountered by the linear classifier algorithm, causing the item to be categorized with a higher confidence factor. More specifically, the reviewer(s) input is used by the algorithm module 118 to improve the set of tokenized phrases utilized by the linear classifier algorithm which enables the linear classifier algorithm to better distinguish between two items, improving its confidence factor and causing the linear classifier algorithm to properly choose the right category next time it is presented with the same type of item.

Figure 6:
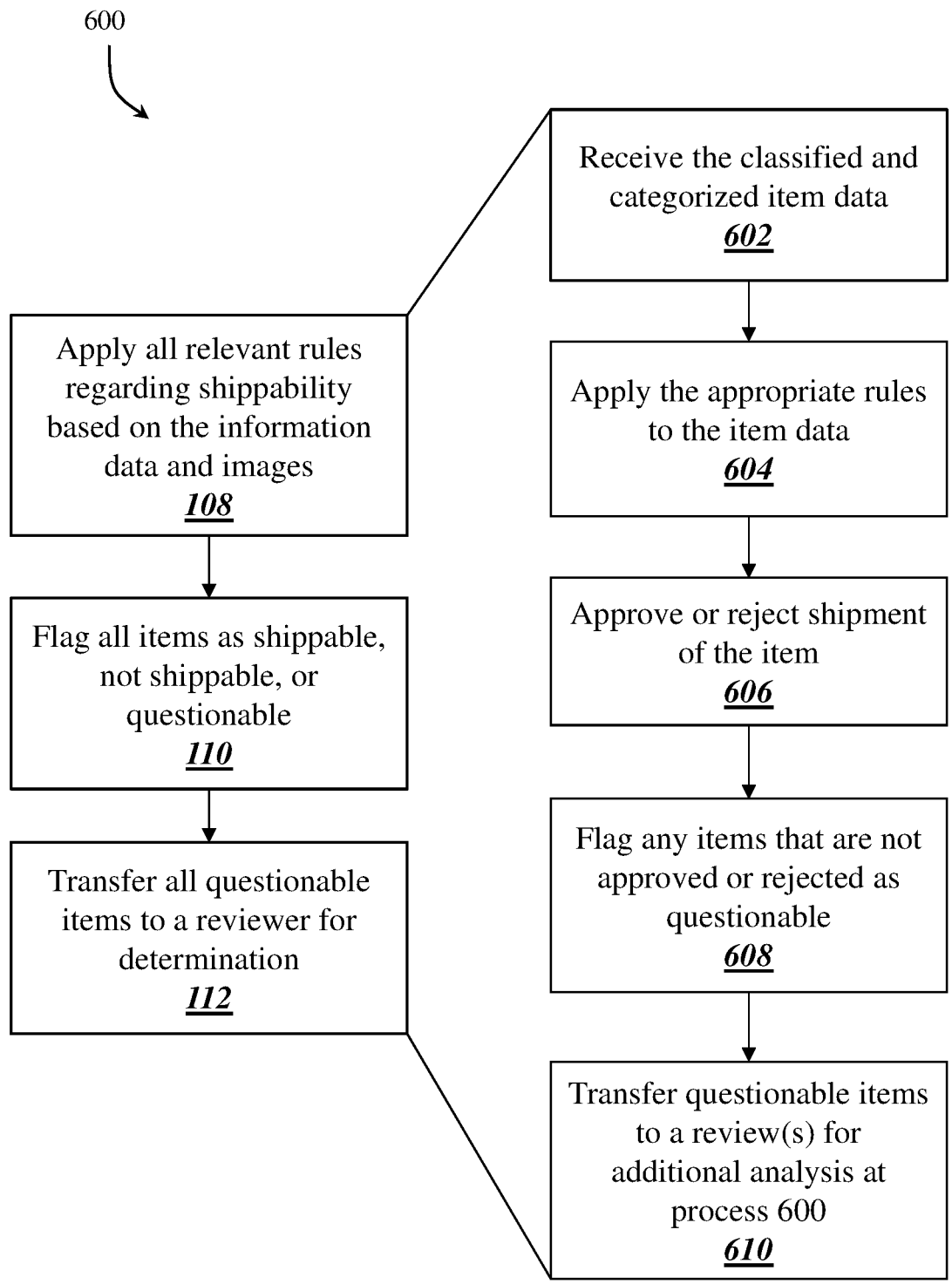
FIG. 6 is an illustrative flowchart depicting the process 600 of operation of the rules engine, in accordance with aspects of the invention.

FIG. 6 depicts an illustrative example process 600 for operation of the rules engine 120. In particular, FIG. 6 depicts the process 600 for the rules engine 120 accepting or rejecting the shippability of items based on the controlling rules in the applicable jurisdictions. Initially, at step 602, the rules engine 120 receives classified and categorized item data for one or more items. The classified and categorized items can be received as a result of the processes 400 or 500, depending on if the items were acceptably classified by the algorithm module 118 or if the items needed modification by an independent reviewer(s).

At step 604 the rules engine 120 applies the appropriate rules to the item data. In particular, the rules engine 120 applies the rules specific to a particular jurisdiction and based on the class and category of the item. For example, the rules engine 120 looks up rules that apply for the class and category of an item as it applies to a destination country (e.g., the rules dictated by the customs and regulations of that country). As would be appreciated by one skilled in the art, the rules engine 120 has access to a database of rules for each combination of items and destination countries, such that an autonomous determination of shippability can be calculated.

At step 606 the rules engine 120 approves or rejects the item for shippability based on the applied rules for that jurisdiction and item class/category. For example, if an item infringes intellectual property of a destination country or exceeds a maximum weight for that class of item, the rules engine 120 will make the determination to reject that item for shipment. Items can also be accepted or rejected for the value of the item being higher than what is allowed to be imported, the inclusion of certain chemicals, batteries, or the class of an item (e.g., weapons). In accordance with an example embodiment of the present invention, the rules engine 120 can positively accept or reject shipment of an item based on meeting or failing to meet specific criteria of the governing rules.

At step 608 the rules engine 120 flags any items that are not positively determined to be approved or rejected as questionable. In particular, there are instances in which an item cannot be automatically recognized by the rules engine 120 due to various factors such as vague/incomplete description, lack of tags/keywords, or unrecognizable or missing images. At step 610 items that are tagged as questionable are transferred for additional analysis by a separate reviewer(s). The transferring proceeds to process 700 discussed with respect to FIG. 7.

Figure 7:
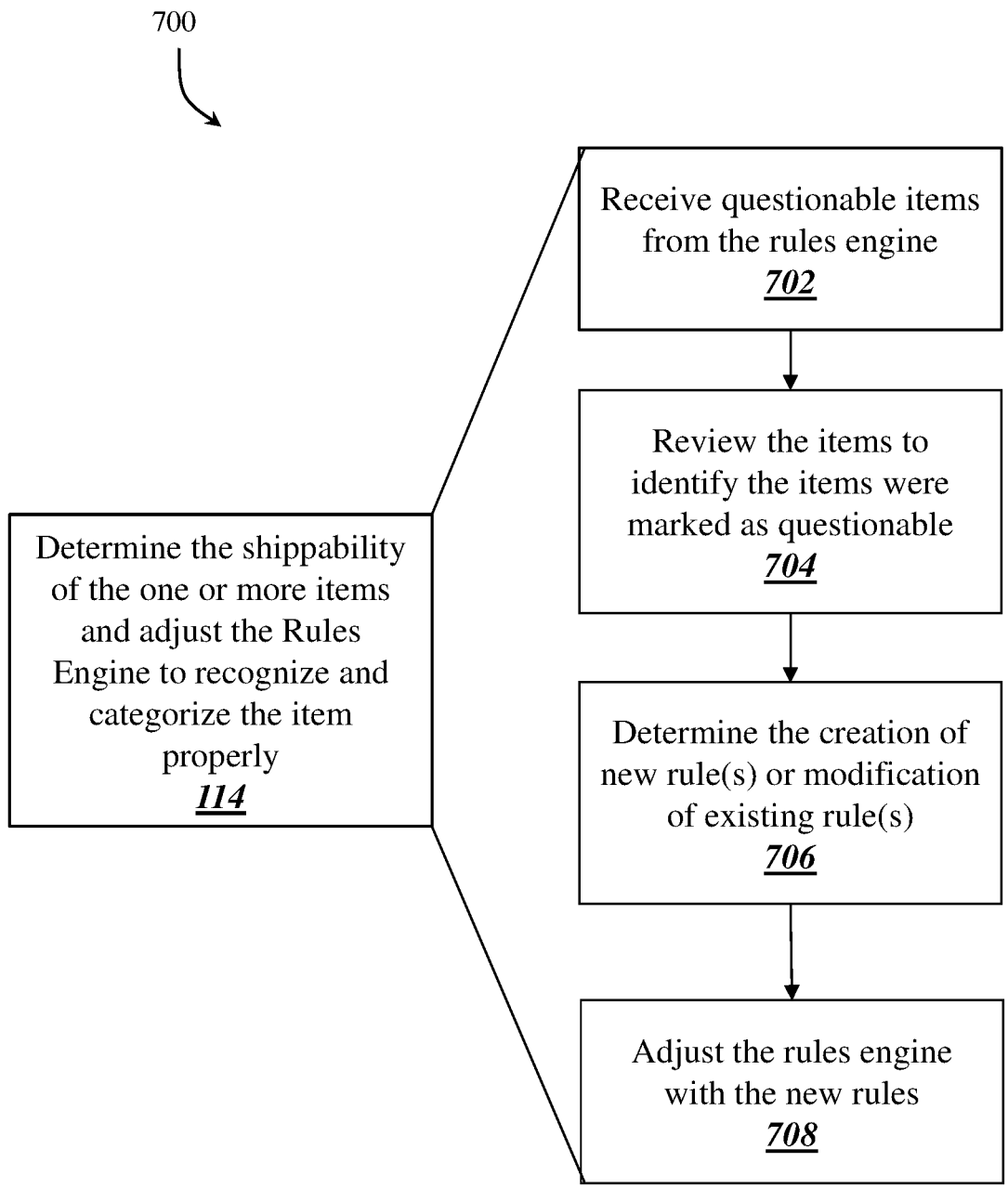
FIG. 7 is an illustrative flowchart depicting process to be followed by the review team, in accordance with aspects of the invention.

FIG. 7 depicts an illustrative example of the process 700 to be followed by the review team to determine the cause for the rules engine 120 flagging an item as questionable. Initially, at step 702, the reviewer(s) receive the questionable items from the rules engine 120. As would be appreciated by one skilled in the art, the reviewer(s) can receive the questionable items in any format suitable for reviewing the items for shippability. For example, the reviewer(s) can have docket of questionable items to review along with access to all the data and images for each of those items (e.g., as provided by the data gathering and staging system). At step 704 to the reviewer(s) review the questionable item to identify why the items was flagged as questionable. At step 706 the reviewer(s) determines whether the creation of a new rule(s) or modification of existing rule(s) utilized by the rules engine 120 is necessary. In particular, the reviewer(s) determines whether a new rule or modification to a rule would enable the rules engine 120 to correctly approve or reject the previously marked questionable item. At step 708 the reviewer(s) causes the rules engine 120 to adjust the rules relied upon when determining the shippability of an item. Once the information the update rules are provided back to the rules engine 120, the rules engine 120 can use the new information to properly flag and process similar items in the future.

Figure 8:
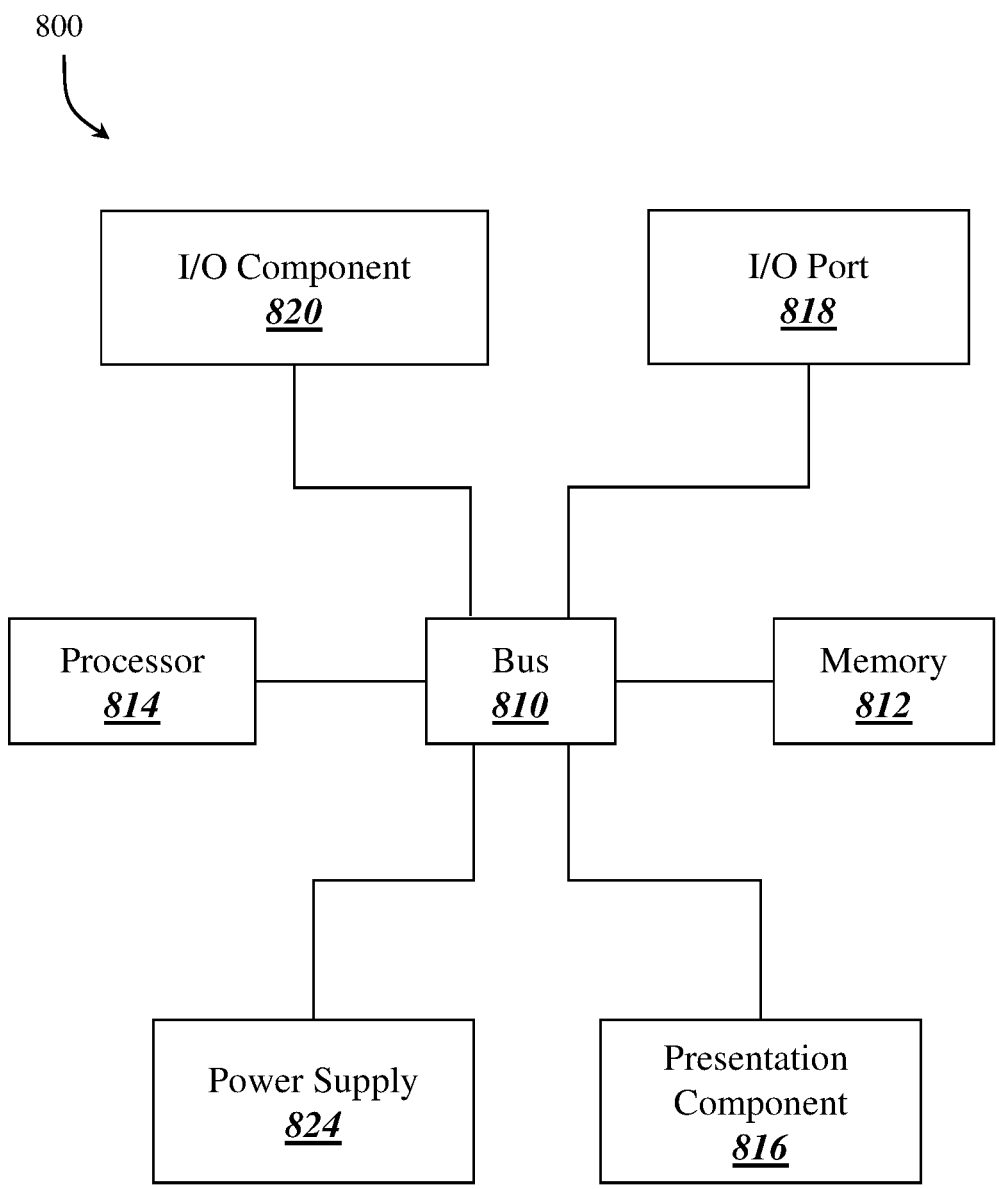
FIG. 8 is a diagrammatic illustration of a high level architecture for implementing processes in accordance with aspects of the invention.

Any suitable computing device can be used to implement the computing devices and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 800 is depicted in FIG. 8. The computing device 800 is merely an illustrative example of a suitable computing environment and in no way limits the scope of the present invention. A "computing device," as represented by FIG. 8, can include a "workstation," a "server," a "laptop," a "desktop," a "hand-held device," a "mobile device," a "tablet computer," or other computing devices, as would be understood by those of skill in the art. Given that the computing device 800 is depicted for illustrative purposes, embodiments of the present invention may utilize any number of computing devices 800 in any number of different ways to implement a single embodiment of the present invention. Accordingly, embodiments of the present invention are not limited to a single computing device 800, as would be appreciated by one with skill in the art, nor are they limited to a single type of implementation or configuration of the example computing device 800.

The computing device 800 can include a bus 810 that can be coupled to one or more of the following illustrative components, directly or indirectly: a memory 812, one or more processors 814, one or more presentation components 816, input/output ports 818, input/output components 820, and a power supply 824. One of skill in the art will appreciate that the bus 810 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 8 is merely illustrative of an exemplary computing device that can be used to implement one or more embodiments of the present invention, and in no way limits the invention.

The computing device 800 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 800.

The memory 812 can include computer-storage media in the form of volatile and/or nonvolatile memory. The memory 812 may be removable, non-removable, or any combination thereof. Exemplary hardware devices are devices such as hard drives, solid-state memory, optical-disc drives, and the like. The computing device 800 can include one or more processors that read data from components such as the memory 812, the various I/O components 816, etc. Presentation component(s) 816 present data indications to a user or other device. Exemplary presentation components include a display device, speaker, printing component, vibrating component, etc.

The I/O ports 818 can enable the computing device 800 to be logically coupled to other devices, such as I/O components 820. Some of the I/O components 820 can be built into the computing device 800. Examples of such I/O components 820 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. An automated machine-implemented method for customs approval, the method comprising:
    receiving, using one or more processors, item data that includes a combination of description, meta-tags, and one or more images for each of one or more items undergoing screening for customs approval, wherein the description includes information related to at least one of physical attributes, functionality, or source material of the one or more items;
    applying an image recognition tool and algorithms to one or more item images of the one or more items to detect embedded data comprising one or more identification marks comprising one or more of a trademark, a logo, a copyright, another form of intellectual property, a value of the one or more items, or other criteria of governing rules;
    combining a result of image recognition tool analysis with a description of the one or more items and meta-tags to create a list of identity markers for the item data;
    applying a probability formula utilizing the list of identity markers to determine one or more categories matching one or more predefined categories for the one or more items based on key words and phrases located within the list of identity markers;
    determining whether the one or more items are shippable or not, in accordance with rules of shippability;
    wherein determining whether the one or more items are shippable or not, in accordance with rules of shippability further comprises utilizing a keyword-based rules engine to determine whether the one or more items are shippable; and
    wherein combining the result of image recognition tool analysis with a description of the one or more items and meta-tags further comprises:
        classifying or categorizing the item data, using machine learning algorithms of an algorithm module, into one or more predefined classes or categories, wherein inputs to machine learning algorithms comprise keywords derived from one or more of item description, meta-tags, results of an image recognition tool analysis applied to one or more item images, or a combination thereof; and
        combining one or more item classes or item categories from the classifying or categorizing of the item data and a result of image recognition tool analysis with a description of the one or more items and meta-tags for use by the keyword-based rules engine to approve or reject the one or more items for shippability based on applied rules.

2. The method of claim 1, wherein if the machine learning algorithm is unable to determine one or more predefined classes or categories from classifying or categorizing the item data to a predetermined acceptable threshold level of confidence, the one or more items are marked as one or more questionable items and forwarded to a reviewer.

3. The method of claim 2, further comprising training of the machine learning algorithm with classification data or categorization data from the reviewer.

4. The method of claim 1, wherein the predefined classes or categories correspond to a predetermined set of rules and regulations for a destination country.

5. The method of claim 1, wherein the item data is provided by a manufacturer, seller, logistics company, or reseller of the one or more items.

6. The method of claim 1, wherein the item data is obtained from an online catalog or online information comprising the one or more items provided by a seller of the one or more items.

7. The method of claim 1, wherein the description includes information related one or more of physical attributes, functionality, and source material of the one or more items.

8. The method of claim 1, further comprising deriving the rules of shippability from rules established by governmental or regulatory authorities within a destination country.

9. The method of claim 1, further comprising marking the one or more items as questionable if there is insufficient and/or contradicting information about the one or more items.

10. The method of claim 9, further comprising transmitting data from a questionable item to a reviewer.

11. The method of claim 10, further comprising updating the rules of shippability to include new rules or modified existing rules to adjust rules relied upon when determining shippability of an item in the future.

12. The method of claim 1, wherein the rules of shippability are provided by one or more of rules and regulations within a destination country customs and regulations agency, rules governing intellectual property (IP), internal set rules of any other party, or a combination thereof.

13. The method of claim 1, wherein the item data corresponds to information used to market and sell the one or more items in an online catalog or other online information provided by a seller.

14. The method of claim 1, further comprising searching data streams, by the image recognition tool, from additional sources over a network, comprising online information, to identify similar items in item images and associate related online information embedded data comprising keywords with the one or more item images.

15. The method of claim 1, further comprising using image recognition and onscreen-character recognition technology, by the image recognition tool, to extract known logos, copyrights and textual information from the one or more item images.

16. A system comprising:
    one or more processors configured to receive item data comprising a combination of description, meta-tags, and one or more images for each of one or more items undergoing screening for customs approval, wherein the description includes information related to at least one of physical attributes, functionality, or source material of the one or more items;
    an engine configured to enable access to, add, modify and update rules of shippability to include new rules or modified existing rules based on previously received item data and previously received combinations of results of image recognition tool analysis and descriptions and meta-tags, to be utilized by the engine when determining shippability of an item;
    an image recognition tool configured to detect embedded data comprising one or more identification marks comprising one or more of a trademark, a logo, a copyright, another form of intellectual property, a value of the one or more items, or other criteria of governing rules of the one or more images for the one or more items;

the one or more processors configured to combine the detected embedded data of the image recognition tool with a description of the one or more items and meta-tags;

wherein the engine is configured to determine if the one or more items are shippable or not, in accordance to rules of shippability, wherein the engine further comprises a keyword-based rules engine; and wherein the one or more processors are further configured to:

classify or categorize the received item data, using machine learning algorithms of a machine learning algorithm module, into one or more predefined classes or categories, wherein inputs to the machine learning algorithm module comprise keywords derived from one or more of item description, meta-tags, results of an image recognition tool analysis applied to item images, or a combination thereof; and combine results of classification or categorization of the one or more items and results of image recognition tool analysis with a description of the one or more items and meta-tags for use by the keyword-based rules engine to approve or reject the one or more items for shippability based on applied rules.

17. The system of claim 16, wherein if the machine learning algorithms are unable to determine one or more predefined classes or categories from classifying or categorizing the item data to a predetermined acceptable threshold level of confidence, the one or more items are marked as one or more questionable items and forwarded to a reviewer.

18. The system of claim 17, further configured to train the machine learning algorithm with classification data or categorization data from the reviewer.

19. The system of claim 16, wherein the predefined classes or categories correspond to a predetermined set of rules and regulations for a destination country.

20. The system of claim 16, wherein the item data is provided by a manufacturer, seller, logistics company, or reseller of the one or more items.

21. The system of claim 16, wherein the item data is obtained from an online catalog or online information comprising the one or more items provided by a seller of the one or more items.

22. The system of claim 16, wherein description includes information related to one or more of physical attributes, functionality, and source material of the one or more items.

23. The system of claim 16, wherein the rules of shippability are derived from one or more of rules established by governmental or regulatory authorities within a destination country.

24. The system of claim 16, wherein the one or more items are marked as questionable if there is insufficient information about the one or more items.

25. The system of claim 24, further comprising transmitting data of one or more questionable items to a reviewer to manually determine shippability of the one or more questionable items.

26. The system of claim 16, wherein the rules of shippability are provided by one or more of rules and regulations within a destination country's customs and regulations agency, rules governing intellectual property (IP), internal set rules of any other party, or a combination thereof.

27. The system of claim 16, wherein the item data corresponds with information used to market and sell the one or more items in an online catalog or other online information provided by a seller.

28. The system of claim 16, wherein the image recognition tool is configured to search data streams from additional sources over a network, comprising online information, to identify similar items in item images and associate related online information embedded data comprising keywords with the one or more images for each of the one or more items.

29. The system of claim 16, wherein the image recognition tool uses image recognition and onscreen-character recognition technology to extract known logos, copyrights and textual information from the one or more images.

30. The method of claim 1 further comprising accessing and updating rules of shippability of the keyword-based rules engine to include new rules or modified existing rules based on previously received item data and previously received combinations of results of image recognition tool analysis and descriptions and meta-tags, to be utilized by the keyword-based rules engine when determining shippability of an item.

31. The method of claim 30, further comprising determining, utilizing the keyword-based rules engine whether the one or more items are shippable or not, in accordance with rules of shippability after accessing and updating rules of shippability of the keyword-based rules engine.

32. The system of claim 16, wherein the one or more items are marked as questionable if there is contradicting information about the one or more items.

33. The system of claim 16, wherein the one or more items are marked as questionable if there is insufficient and contradicting information about the one or more items.

* * * * *